United States Patent [19]
Horton

[11] 3,802,891
[45] Apr. 9, 1974

[54] SEMI-PERMANENT REFRACTORY MOLDS AND MOLD PARTS

[75] Inventor: Robert A. Horton, Chesterland, Ohio

[73] Assignee: Precision Metalsmiths, Inc., Cleveland, Ohio

[22] Filed: Aug. 18, 1971

[21] Appl. No.: 172,949

Related U.S. Application Data

[63] Continuation-in-part of Ser. No. 814,002, April 7, 1969, abandoned.

[52] U.S. Cl............ 106/38.3, 106/38.35, 106/38.9, 264/56, 264/63
[51] Int. Cl............................................. B28b 7/34
[58] Field of Search............... 106/38.3, 38.35, 38.9, 106/63; 264/56, 63

[56] References Cited
UNITED STATES PATENTS

| 3,232,771 | 2/1966 | Pearce | 106/38.35 |
| 3,326,701 | 6/1967 | von Freyhold | 106/38.35 |
| 3,432,312 | 3/1969 | Feagin et al. | 106/38.3 |
| 3,641,229 | 2/1972 | Lawrence et al. | 264/43 |

Primary Examiner—Lorenzo B. Hayes
Attorney, Agent, or Firm—Watts, Hoffmann, Fisher & Heinke Co.

[57] ABSTRACT

Semi-permanent or reusable refractory molds and mold parts are made from wollastonite. A slurry of wollastonite and silicious binder is set in the desired shape, dried, and fired at a temperature of at least 2,050°F. to sinter the wollastonite.

12 Claims, 1 Drawing Figure

PATENTED APR 9 1974　　　　　　　　　　3,802,891
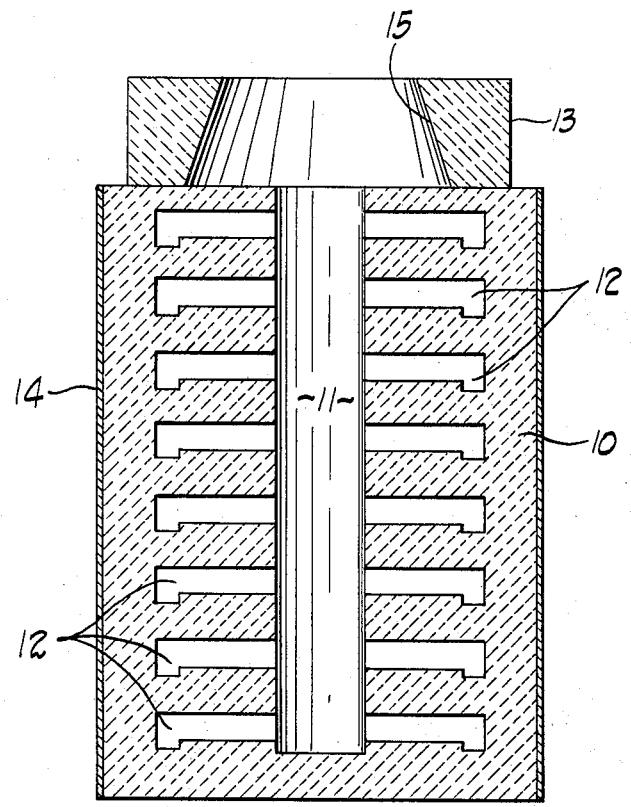
INVENTOR.
ROBERT A. HORTON
BY Watts, Hoffmann,
Fisher & Heinke
ATTORNEYS.

SEMI-PERMANENT REFRACTORY MOLDS AND MOLD PARTS

CROSS-REFERENCE TO RELATED APPLICATION

This application is a continuation-in-part of application Ser. No. 814,002, filed Apr. 7, 1969, now abandoned.

SUMMARY OF THE INVENTION

The present invention relates generally to the manufacture of semi-permanent or reusable refractory molds and mold parts suitable for casting relatively low melting temperature metals, such as zinc-base, aluminum-base and copper base alloys and the like, and more specifically to materials and methods for making such molds and mold parts.

An object of the present invention is to provide for the manufacture of refractory molds and mold parts which have the combined advantages of permanent metal molds and conventional refractory investment molds. Permanent metal molds have the advantage of being reusable, but are expensive and are normally made to produce only relatively simple parts. Investment molds are inexpensive compared to permanent molds and can be made to produce castings of any desired degree of complexity, but are used only once. In investment casting, a new mold is made for each pattern setup and is destroyed after being cast. Molds and mold parts made in accordance with the present invention are inexpensive and can be used repeatedly to produce a large number of castings. The complexity of the castings produced in the molds can be extended over a wide range by using pre-formed ceramic cores inserted into the molds prior to being cast with metal.

Another object of the invention is to provide refractory molds and mold parts having the advantages set forth above and which are further characterized by excellent thermal shock resistance, good strength and hardness, and the capability of producing castings having smooth surfaces and fine detail.

The foregoing objects and advantages are attained in accordance with this invention by using a slurry consisting essentially of refractory material, which is principally wollastonite, and a silicious bonding agent, such as colloidal silica, a hydrolyzed alkyl silicate or the like. The slurry is poured into a mold or around a pattern and is allowed to set to form the desired shape of a mold or mold part. The mold or mold part is dried and is then fired at an elevated temperature to sinter the refractory material and produce a dense, strong and hard structure.

A substantial portion of the wollastonite aggregate is made up of coarse particles having a size more than 100 mesh. A preferred aggregate is comprised of from about 45% to 80% by weight of a graded mixture of coarse particles having a minimum size of +100 mesh and a size distribution such that about 90% by weight of the mixture is larger than 100 mesh and from about 22% to 30% by weight of the mixture is +20 mesh or larger. The graded mixture of coarse particles is preferably blended with fine wollastonite in an amount of from about 20% to 55% by weight of the aggregate, the fine wollastonite having a preferred average particle size of from about 2 to about 8 microns.

It is believed that the advantageous characteristics of the molds and mold parts made by use of the foregoing slurry compositions arise from the excellent thermal shock resistance imparted by the relatively low coefficient of thermal expansion of the wollastonite and by the interlocking structure of the randomly oriented, acicular or needleshaped particles of the coarse wollastonite fraction. The fine wollastonite particles, which may or may not be highly acicular, are believed to fill the spaces between the coarse particles to produce a smooth surface and dense structure which sinters readily without the addition of other materials.

Other objects, advantages and a fuller understanding of the invention will be had by reference to the following detailed disclosure and the accompanying drawing.

BRIEF DESCRIPTION OF THE DRAWING

The drawing is a schematic illustration in vertical cross-section of an investment mold provided with a reusable, pouring basin collar made in accordance with the present invention.

DESCRIPTION OF THE PREFERRED EMBODIMENTS

The mold material composition of this invention is a slurry of refractory material which is principally wollastonite and a silicious bonding agent, such as colloidal silica, a hydrolyzed alkyl silicate or the like. Although a portion of the refractory aggregate of the slurry may consist of materials other than wollastonite, it has been found that the characteristics of the molds and mold parts produced in accordance with this invention improve as the percentage of wollastonite is increased. It is desirable that the refractory aggregate be at least 85% wollastonite, and it is preferable that the slurry aggregate be almost entirely wollastonite. For the same reasons, it is desirable to use a relatively pure grade of wollastonite.

Wollastonite is a naturally occuring mineral consisting of calcium metasilicate ($CaSiO_3$). It occurs naturally in acicular form and is readily processed to yield needleshaped particles having a length to diameter ratio of 10 to 1 or higher. A suitable grade of wollastonite for use in accordance with this invention is distributed commercially by the Cabot Corporation under the tradename CAB-O-LITE.

In order to produce sintered wollastonite molds exhibiting thermal shock resistance, good strength and hardness, it is essential that a substantial portion of the wollastonite aggregate consist of coarse particles having a size greater than 100 mesh. More preferably, the aggregate should be comprised of from about 40% to about 72% by weight particles which are of a size greater than 100 mesh. The preferred wollastonite aggregate is more specifically comprised of from about 45% to 80% by weight of a graded mixture of coarse particles having a minimum size of +100 mesh and a size distribution such that about 90% by weight of the mixture is larger than 100 mesh and from about 22% to about 30% by weight of the graded mixture is +20 mesh or larger. A suitable graded mixture of coarse wollastonite particles is sold under the tradename CAB-O-LITE C–101 and has the following typical screen analysis:

78% minus 20 mesh
47% minus 35 mesh
30% minus 45 mesh
15% minus 70 mesh

8% minus 100 mesh
2% minus 200 mesh

In order to promote sintering, the wollastonite mixture is preferably prepared to include from about 20% to 55% by weight of fine wollastonite particles having a size less than 100 mesh, and more particularly, an average size of from about 2 to 8 microns as detected by the Fischer Sub-Sieve Size. The fine wollastonite content of the aggregate may or may not be acicular.

A gel accelerator for the silicious bonding agent may be included in the slurry if needed. In some cases the silicious binder can be prepared to have a short period of stability so that the slurry will set up in a convenient length of time without requiring the addition of a gelling agent. In other cases, the wollastonite itself may serve to gel or set the binder.

Suitable silicious binders include hydrolyzed solutions of the lower alkyl silicates which are capable of depositing gelatinous silica, such as methyl silicate, ethyl silicate, isopropyl silicate, etc. These binders are normally hydrolyzed in the presence of an acid, and can be gelled by the addition of alkaline materials.

Suitable silicious binders also include the various grades of colloidal silica which are prepared commercially from solutions of sodium silicate by removing the sodium ions through ion exchange. Typical binders of this type are sold under tradenames such as LUDOX (E. I. Du Pont De Nemours & Co.), NALCOAC (Nalco Chemical Co.), and SYTON (Monsanto Chemical Co.). Colloidal silica sols are available which are stabilized both by acid and by alkali. Acid-stabilized sols can be gelled by the addition of alkaline materials that raise the pH above about 5. Alkali-stabilized sols become unstable in the presence of foreign ions and the gel times can be conveniently regulated by adding proper amounts of any of a wide variety of salts, such as sodium chloride, sodium acetate, ammonium acetate, ammonium chloride and the like.

When making a mold or mold part, a slurry composition prepared as discussed above is poured into a mold or around a pattern to produce the desired shape and is allowed to set. When the composition has set, it is removed from the mold or pattern and the shape is subsequently fired at an elevated temperature to drive off volatiles and to sinter the material to its final strength and hardness. Suitable firing temperatures are in the range of about 2,050°F. to about 2,200°F. Higher firing temperatures can be used but appear to offer no particular advantage. The firing is usually preceded by a drying period at room temperature or in a low temperature oven.

As generally discussed above, it is believed that the excellent characteristics of the mold and mold parts produced in accordance with the present invention arise from the excellent thermal shock resistance imparted by the relatively low coefficient of thermal expansion of the wollastonite and the interlocking structure provided by the randomly oriented needles of the coarse wollastonite fraction. The fine wollastonite particles produce a freely flowing mixture which fills the spaces between the coarse particles to form a smooth surface and a dense structure which sinters readily without the addition of other materials. The flow characteristics of the slurries can sometimes be improved by small additions of extremely fine clay.

EXAMPLE I

The mold material composition of this invention can be used to advantage in making reusable pouring collar basins adapted for use in conjunction with investment molds, such as shown in the drawing. Referring to the drawing, reference numeral 10 designates a bulk investment mold having a sprue passageway 11 and mold cavities 12 gated into the sprue passageway along its length. A reusable pouring basin collar 13 formed in accordance with this invention is disposed on the top of the mold in communication with the sprue passageway 11. The mold 10 is shown within a flask 14. It will be seen that the collar 13 provides for a pouring basin and for a riser of metal outside of the flask 14. By eliminating the need to provide space for a pouring basin or riser within the flask itself, it is possible to cast more parts within a mold of given external dimensions than heretofore possible, since the full height of the flask becomes available for mold cavities.

An excellent slurry formulation for making reusable pouring basin collars is as follows:
  Coarse grade wollastonite
    (70% minus 20 mesh +100 mesh)
    70% by weight of solids content
  Powder grade wollastonite
    (particle size from about 2 to about 8 microns)
    27% by weight of solids content
  Phosphorus pentoxide powder
    3% by weight of solids content
  Colloidal silica
    200 ml per 1,000 grams of solids In the above formulation, the colloidal silica serves as both the carrier liquid and the bonding agent. The amount of colloidal silica which can be used to prepare the slurry may vary widely, but a ratio of 200 milliliters of colloidal silica for each kilogram of solids has been found to produce good results. This ratio yields a heavy mix which can be poured under vibration into a suitable mold. The slurry formulated as described above will set quickly and the collar can be removed from the mold in approximately 10 minutes. The setting time can be adjusted, however, by varying the amount of phosphorus pentoxide.

An aluminum mold lubricated with a thin layer of low melting temperature sperm wax is satisfactory for making the collars. The slurry may be poured or vibrated carefully into the mold to avoid entrapping air bubbles on the inside surface 15 of the molded collar. Alternatively, the slurry can be poured into the aluminum mold without any special care and a coating of a suitable mold or ladle wash applied to the inside surface 15 of the collar to fill any small holes that might make it difficult to remove the collar from the metal casting when the collar is used. Any conventional wash, such as used in connection with permanent molds, is suitable for use on the collar.

After the slurry has set, the pouring basin collar is dried at a temperature of about 150°F. and is then fired at a temperature of approximately 2,200°F. for a period of two hours. The collars made in accordance with this procedure and composition have good strength and hardness, as well as excellent thermal shock resistance. They have been found to have a long service life when used to provide an external pouring basin for bulk investment molds cast with aluminum and copper-base alloys.

EXAMPLE II

A reusable mold for a small commercial part was made from a composition consisting of wollastonite aggregate slurried in colloidal silica in a ratio of 233 milliliters of colloidal silica per 1,000 grams of wollastonite. The wollastonite was a graded mixture of 70% coarse, acicular particles and 30% fine grade material. The binder was an acid-stabilized colloidal silica containing 28% $SiO_2$, 32% water and 40% isopropanol. In this mix, the wollastonite itself served to gel the binder. Aqueous slurries of wollastonite have an alkaline pH which causes the pH of the acid-stabilized colloidal silica to rise into the range where it is unstable, thereby causing it to gel.

The slurry of this example was made more fluid than in Example I, since it was required to produce a mold having a smooth surface free of air bubbles or other defects. The slurry was poured with vibration over positive plaster patterns to produce two mating mold halves which were allowed to set over night before being lifted. After drying at 150°F. the mold halves were fired to 2,200°F. and held for 2 hours. The two halves were then cooled to around room temperature and were clamped together for casting. The strength of the mold halves was sufficient to permit tight clamping. After being used to make 28 aluminum castings, the mold remained satisfactory for reuse. The same composition was used to make molds for copper-base alloys.

EXAMPLE III

The following is an example of a satisfactory mold composition bonded with ethyl silicate in a ratio of 200 milliliters of binder per 1,000 grams of dry solid refractory material. The refractory aggregate of the slurry consisted of 70% coarse wollastonite particles and 30% fine powder grade wollastonite. The binder was made by stirring together the following ingredients until the hydrolysis reaction was completed:

2,120 milliliters ethyl silicate
1,680 milliliters denatured alcohol
150 milliliters water
50 milliliters of an aqueous 4% solution of hydrochloric acid The foregoing slurry composition required 45 to 60 minutes to set with the time of setting varying somewhat with the age of the binder solution. The wollastonite served as the gelling agent. The molded shapes were dried and fired as in Example II.

EXAMPLE IV

Another satisfactory composition mix usable to produce molds and mold parts consists of a slurry having a solids content of 48.86% by weight coarse wollastonite particles, 48.86% by weight powder grade wollastonite and 2.28% phosphorus pentoxide. In this example the solids were mixed with colloidal silica in a ratio of 202 milliliters of binder to 1,000 grams of solids to form the slurry. The shapes molded with this composition may be fired at temperatures of 2,050°F. or higher.

It will be apparent from the foregoing that the invention has achieved the objectives of providing an inexpensive mold composition material which is usable to produce semi-permanent refractory molds and mold parts. The slurry composition of the invention is characterized by a refractory material preferably consisting of graded sizes of wollastonite and a silicious bonding agent. While the invention has been described in connection with the foregoing examples as being used to produce relatively simple molds, it is to be understood that the complexity of the castings produced in the molds can be extended by use of refractory or ceramic cores.

Many modifications and variations of the invention will be apparent to those skilled in the art in the light of the foregoing detailed disclosure. Therefore, it is to be understood that, within the scope of the appended claims, the invention can be practiced otherwise than as specifically described.

What is claimed is:

1. A method of making semi-permanent or reusable molds and mold parts comprising the steps of preparing a slurry of refractory material and siliceous binder capable of bonding the refractory material into a composite mass, said refractory material being at least 85% by weight wollastonite aggregate, said wollastonite aggregate containing from about 45% to about 80% by weight particles having a size of at least 100 mesh and from about 20% to about 55% by weight particles having a size less than 100 mesh, allowing the slurry to set in a desired shape, drying the shape, and firing the shape to a temperature of 2,050°F. or higher to sinter the refractory material.

2. A method as claimed in claim 1 wherein said wollastonite aggregate is comprised of from about 45% to about 80% by weight of a graded mixture of coarse, acicular particles having a minimum size of +100 mesh and a size distribution such that about 90% by weight of said mixture are particles larger than 100 mesh and from about 22% to 30% by weight of said mixture are particles of a size of at least +20 mesh.

3. A method as claimed in claim 1 wherein said wollastonite aggregate is comprised of from about 20% to about 55% by weight particles having an average size of from about 2 to 8 microns.

4. A method as claimed in claim 1 wherein the slurry includes a gelling agent for the silicious binder.

5. A method of making semi-permanent or reusable molds and mold parts comprising the steps of forming a bonded shape from a refractory material and siliceous binder, said refractory material consisting essentially of wollastonite, from about 45% to about 80% by weight of said wollastonite being a graded mixture of acicular particles having a minimum size of +100 mesh, and firing the shape to a temperature of 2,050°F. or higher to sinter the wollastonite and form an interlocking structure of acicular particles.

6. A method as claimed in claim 5 wherein said graded mixture has a particle size distribution ranging from a mimimum of +100 mesh to a maximum of +20 mesh or larger.

7. A method as claimed in claim 6 wherein from about 20% to about 55% by weight of said wollastonite is made up of particles having an average size of from 2 to 8 microns.

8. A method of making semi-permanent or reusable molds and mold parts comprising the steps of forming a bonded shape from a refractory material and siliceous binder, said refractory material consisting essentially of wollastonite, said wollastonite containing from about 45% to about 80% by weight acicular particles having a minimum size of +100 mesh and a size distribution such that 90% by weight of said acicular particles are larger than 100 mesh and from about 22% to 30% by weight of said acicular particles are at least +20 mesh, and from about 20% to about 55% by weight particles having a size smaller than 100 mesh, and firing the shape to a temperature of 2,050°F. or higher to sinter the wollastonite.

9. A method as claimed in claim 8 wherein said refractory material is at least 85% by weight wollastonite.

10. A sintered refractory article consisting essentially of wollastonite aggregate and siliceous binder, from about 45% to about 80% by weight of said aggregate being acicular particles having a size of at least +100 mesh, and from about 20% to about 55% by weight of said aggregate being particles having a size less than 100 mesh.

11. An article as claimed in claim 10 wherein said acicular particles are a graded mixture having a size distribution such that about 90% by weight of said mixture are particles larger than 100 mesh and from about 22% to about 30% by weight of said mixture are particles having a size of at least +20 mesh.

12. An article as claimed in claim 11 wherein said particles which are smaller than 100 mesh have an average size of from about 2 to about 8 microns.

* * * * *